(12) United States Patent
Li et al.

(10) Patent No.: US 7,382,574 B2
(45) Date of Patent: Jun. 3, 2008

(54) LAYERED PERPENDICULAR WRITER WITH POLE TIP PARTIALLY EMBEDDED IN YOKE

(75) Inventors: Shaoping Li, Naperville, IL (US); Chunhong Hou, Savage, MN (US); Lei Wang, Apple Valley, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 410 days.

(21) Appl. No.: 11/006,202

(22) Filed: Dec. 6, 2004

(65) Prior Publication Data

US 2006/0119981 A1 Jun. 8, 2006

(51) Int. Cl.
*G11B 5/147* (2006.01)

(52) U.S. Cl. ............... 360/125.08; 360/125.45

(58) Field of Classification Search ................ 360/126, 360/125.08, 125.45
See application file for complete search history.

(56) References Cited

U.S. PATENT DOCUMENTS

| | | | |
|---|---|---|---|
| 5,132,859 A | 7/1992 | Andricacos et al. | |
| 5,157,570 A | 10/1992 | Shukovsky et al. | |
| 5,471,358 A | 11/1995 | Tadokoro et al. | |
| 5,617,276 A | 4/1997 | Takada et al. | |
| 5,759,681 A | 6/1998 | Hosoe et al. | |
| 6,168,860 B1 | 1/2001 | Daughton | |
| 6,487,042 B2 | 11/2002 | Urai et al. | |
| 6,628,478 B2 * | 9/2003 | Gill | 360/126 |
| 6,721,131 B2 | 4/2004 | Litvinov et al. | |
| 6,807,031 B2 * | 10/2004 | Macken et al. | 360/317 |
| 7,177,117 B1 * | 2/2007 | Jiang et al. | 360/125.12 |
| 2003/0076627 A1 | 4/2003 | Minor et al. | |
| 2003/0197976 A1 | 10/2003 | Van der Heijden et al. | |
| 2004/0004786 A1 | 1/2004 | Shukh et al. | |
| 2004/0037002 A1 | 2/2004 | Kudo et al. | |
| 2004/0042118 A1 | 3/2004 | Notsuke et al. | |
| 2004/0066574 A1 | 4/2004 | Crue et al. | |

* cited by examiner

*Primary Examiner*—A. J. Heinz
(74) *Attorney, Agent, or Firm*—Kinney & Lange, P.A.

(57) ABSTRACT

A perpendicular writer includes a write coil and a main pole having a pole tip for conducting magnetic flux to write data to a magnetic medium. The pole tip includes a plurality of magnetic layers that are magnetically coupled and biased so that their magnetic moment orientations are substantially parallel to an external surface when no write current is applied to the write coil. The pole tip is partially embedded in the yoke, such that portions of the yoke surrounding the pole tip help direct magnetic flux to the pole tip. The pole tip extends beyond the yoke, with a first end located outside the yoke and a second end located within the yoke.

28 Claims, 8 Drawing Sheets

FIG. 10

LAYERED PERPENDICULAR WRITER WITH POLE TIP PARTIALLY EMBEDDED IN YOKE

CROSS-REFERENCE TO RELATED APPLICATION(S)

None.

FIELD OF THE INVENTION

The present invention relates generally to the field of electronic data storage and retrieval, and more particularly to a device for emitting magnetic flux, such as a perpendicular magnetic writer for suppressing on-track erasure and increasing switching speed.

BACKGROUND OF THE INVENTION

Perpendicular recording can support much higher linear density than longitudinal recording due to lower demagnetizing fields in recorded bits, which diminish as linear density increases. To provide decent writeability, double layer media are used. The double layer perpendicular media consist of a high coercivity, thin storage layer with perpendicular to-plane anisotropy and a soft magnetic keeper (underlayer) having in-plane anisotropy and relatively high permeability.

A magnetic head for perpendicular recording generally consists of two portions, a writer portion for writing magnetically-encoded information on a magnetic media (disc) and a reader portion for retrieving magnetically-encoded information from the media. The reader portion typically consists of a bottom shield, a top shield, and a sensor, often composed of a magnetoresistive (MR) material, positioned between the bottom and top shields. Magnetic flux from the surface of the disc (media) causes rotation of the magnetization vector of a sensing layer of the MR sensor, which in turn causes a change in electrical resistance of the MR sensor. The change in resistance of the MR sensor can be detected by passing a current through the MR sensor and measuring a voltage across the MR sensor. External circuitry then converts the voltage information into an appropriate format and manipulates that information as necessary to recover the data that was encoded on the disc.

The writer portion of the magnetic head for perpendicular recording typically consists of a main pole and a return pole which are magnetically separated from each other at an air bearing surface (ABS) of the writer by a non-magnetic gap layer, and which are magnetically connected to each other in a region at a distance away from the ABS. Positioned at least partially between the main and return poles are one or more layers of conductive coils encapsulated by insulating layers. The ABS is the surface of the magnetic head immediately adjacent to the perpendicular medium. The writer portion and the reader portion are often arranged in a merged configuration in which a shared pole serves as both the top or bottom shield of the reader portion and the return pole of the writer portion.

To write data to the magnetic media, an electrical current is caused to flow through the conductive coil, thereby inducing a magnetic field across the write gap between the main and return poles. The main and return poles are made of soft magnetic materials. Both the main and return pole may generate magnetic field in the media during recording when the write current is applied to the coil. However, the main pole produces a much stronger write field than the return pole by having a much smaller cross-sectional area at the ABS. A magnetic moment of the main pole should be oriented along an easy axis parallel to the ABS when the main pole is in a quiescent state, namely without a current field from the write coil. When the magnetic moment does not return to an orientation parallel to the ABS after being subjected to one or multiple excitations of the write current field, the main pole is not stable. In an unstable pole, the orientation of the magnetic moment generally remains non-parallel to the ABS even after current to the write coil is turned off. Thus, the main pole in the quiescent state may still emit a magnetic flux and may deteriorate or even erase data from the disc. Further, an unstable pole results in increased switching time when a write current is applied. In a perpendicular head, the main pole is a predominant source of remanent magnetism due to a strong shape anisotropy perpendicular to the ABS.

Accordingly, there is a need for a writer with minimal remanent magnetization when the write current is switched off. Such a stable writer will reduce switching time, increase data rate of the disc drive, and prevent unintentional erasing on perpendicular media after the write current is turned off.

BRIEF SUMMARY OF THE INVENTION

A device for emitting magnetic flux, such as perpendicular writer, includes a write coil and a pole. The pole includes a yoke and a pole tip connected to the yoke. The yoke is formed of magnetic material. The pole tip includes a plurality of magnetic layers, each layer having a first side and a second side. The plurality of magnetic layers are magnetically coupled and biased so that their magnetic moment orientations are substantially parallel to an external surface of the pole tip when no write current is applied to the write coil.

DETAILED DESCRIPTION

Figure 1:
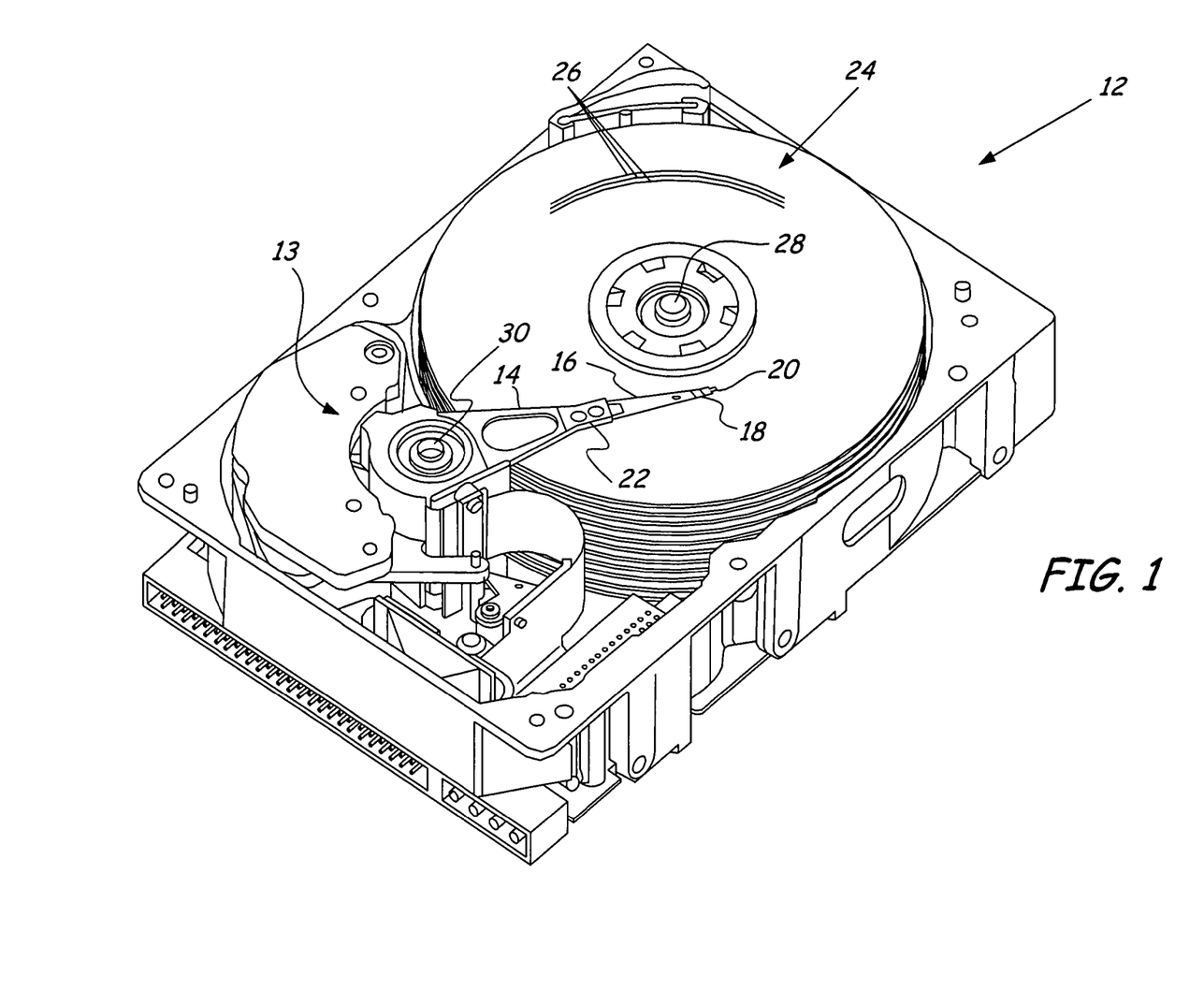
FIG. 1 is a top perspective view of a disc drive.

FIG. 1 shows a top perspective view of disc drive 12, which includes voice coil motor (VCM) 13, actuator arm 14, suspension 16, flexure 18, slider 20, head mounting block 22, and disc or media 24. Slider 20 is connected to the distal end of suspension 16 by flexure 18. Suspension 16 is connected to actuator arm 14 at head mounting block 22.

Actuator arm 14 is coupled to VCM 13. As shown on the right side of FIG. 1, disc 24 has a multiplicity of tracks 26 and rotates about axis 28.

During operation of disc drive 12, rotation of disc 24 generates air movement which is encountered by slider 20. This air movement acts to keep slider 20 aloft a small distance above the surface of disc 24, allowing slider 20 to fly above the surface of disc 24. VCM 13 is selectively operated to move actuator arm 14 around axis 30, thereby moving suspension 16 and positioning the transducing head (not shown) carried by slider 20 over tracks 26 of disc 24. Proper positioning of the transducing head is necessary for reading and writing data on concentric tracks 26 of disc 24.

Figure 2:
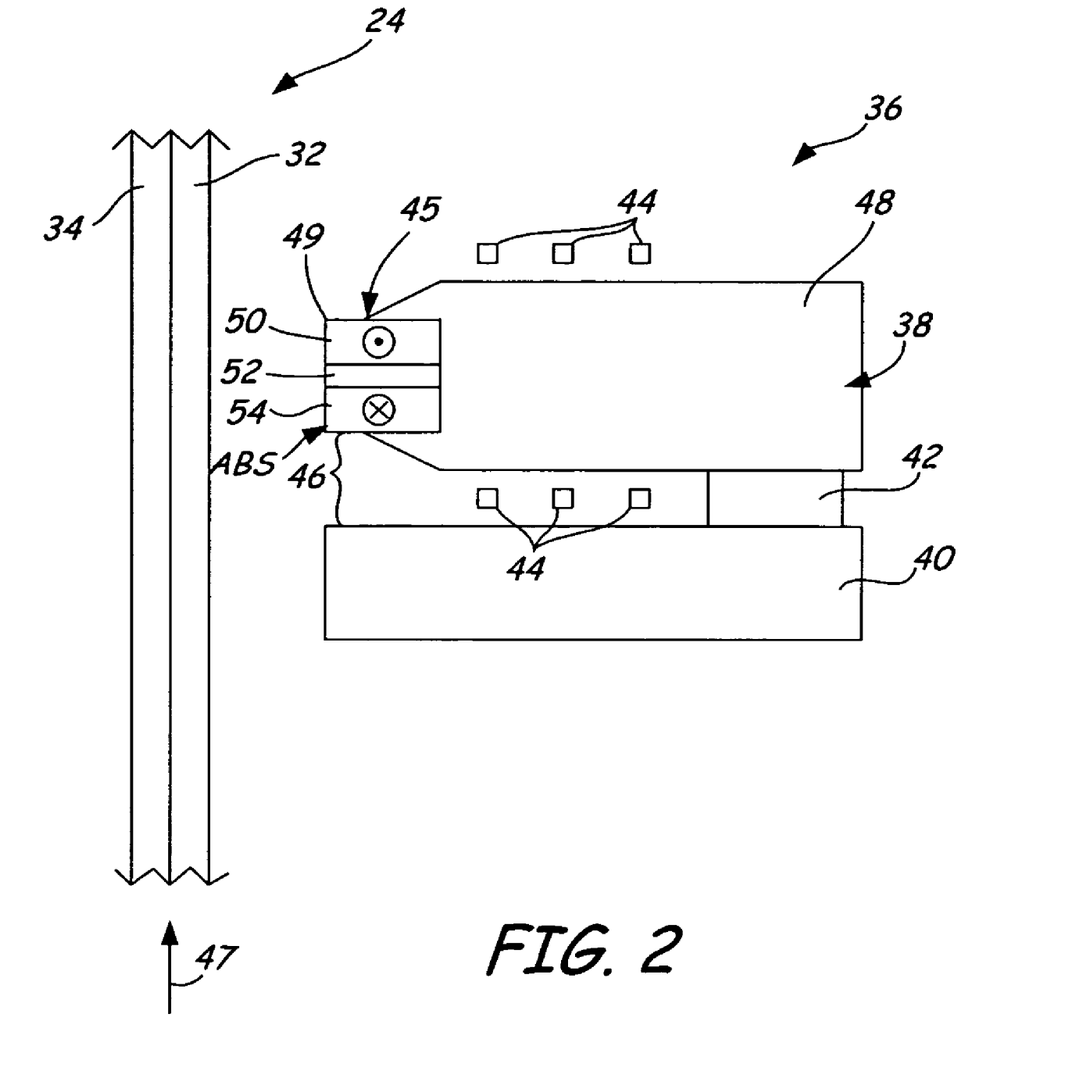
FIG. 2 is a cross-sectional view of a portion of the transducer of the present invention.

FIG. 2 is a cross-sectional view of an embodiment of a magnetic writer 36 of the present invention. Medium 24 for recording comprises thin storage layer 32 having high coercivity and perpendicular anisotropy (the magnetization is held in a direction substantially normal to the surface of medium 24) and soft magnetic underlayer or keeper 34 having high permeability and in-plane orientation of the easy axis. In an exemplary embodiment, writer 36 comprises main pole 38 and return pole 40, connected to each other by back gap closure 42 at a distal end and separated from each other by write gap 46 at the ABS. At least one write coil 44 positioned proximate main pole 38 conducts current around main pole 38, thereby intermittently inducing a magnetic field in main pole 38.

Transducer main pole 38 serves as a trailing pole for the given direction of motion 47 of medium 24. Magnetization transitions on medium 24 are recorded by trailing edge 49 of main pole 38. Main pole 38 includes laminated main pole tip 45 partially embedded in yoke 48. Main pole 38 includes a first end including main pole tip 45 and a second, opposite end. In one embodiment, the first end of main pole 38 defines a plane at the air bearing surface. Yoke 48 has a first end, a second end, and four sides (see FIG. 3). In the illustrated embodiment, main pole tip 45 is attached to the first end of yoke 48. However, main pole tip 45 could also be attached to any of the four sides of yoke 48. In an exemplary embodiment, magnetic layer 50, shown here as the top layer of main pole tip 45, contains trailing edge 49. Generally, the ABS surface of main pole tip 45 is also an external surface of the transducer. In an exemplary embodiment, main pole tip 45 has a submicron width at the ABS, to provide recording of ultra-narrow tracks on medium 24. In an exemplary embodiment, main pole 38 is at least partially embedded in yoke 48. The portions of yoke 48 surrounding main pole tip 45 help to direct the magnetic flux from relatively wide yoke 48 to relatively narrow pole tip 45. The proposed structure of main pole tip 45 increases the uniaxial anisotropy of magnetic layers 50 and 54, thereby rendering main pole 38 more magnetically stable. Lamination of only pole tip 45 of main pole 38 may lead to savings in production costs and materials as well as an efficient writer 36. Flux easily travels through the bulk magnetic material of yoke 48 without disruption from lamination interfaces in the length of yoke 48.

To write data to perpendicular magnetic medium 24, a time-varying write current is caused to flow through coil 44, which in turn produces a time-varying magnetic field through main pole tip 45 and return pole 40. Medium 24 is then passed by the ABS of writer 36 at a predetermined distance such that medium 24 is exposed to the magnetic field. With perpendicular writer 36, the soft magnetic keeper 34 of magnetic medium 24 in essence acts as a third pole of the writer.

A closed path for magnetic flux from writer 36 to medium 24 travels from main pole 38 through storage layer 32 of medium 24 to soft magnetic keeper 34 and returns to writer 36 through return pole 40, again passing through storage layer 32. To ensure that the magnetic field does not write data on this return path, the surface area of return pole 40 at the ABS is preferably substantially larger than the surface area of main pole tip 45 at the ABS. Thus, the strength of the magnetic field affecting storage layer 32 under return pole 40 will not be sufficient to overcome a nucleation field of storage layer 32. In a preferred embodiment, the thickness of main pole tip 45 is between about 0.05 and about 1 micrometer. The total cross-sectional area at the ABS of return pole 40 is preferably greater than 10 times and more preferably greater than 100 times the total cross-sectional area of all the magnetic layers of main pole tip 45.

In an exemplary embodiment, main pole tip 45 has a multilayer structure. Further, in one embodiment, main pole tip 45 is partially embedded in yoke 48. Multilayer main pole tip 45 preferably comprises magnetic layer 50; non-magnetic spacer layer 52; and magnetic layer 54 (shown here as an underlayer).

This multilayer pole structure induces anisotropy in both magnetic layers 50 and 54 parallel to the external surface or ABS, thereby enhancing the magnetic stability of main pole tip 45 while suppressing on-track erasure and increasing switching speed and ultimately increasing the data recording rate and reliability. When top magnetic layer 50 is coupled with magnetic underlayer 54 across non-magnetic layer 52 according to the present invention, the properties of the coupled multilayer system improve the performance of main pole tip 45 compared with a main pole tip made of a single layer of high magnetic moment material. While the layers of main pole tip 45 are illustrated as planar layers, it is contemplated that they may follow other contours. Additionally, the illustrations are not rendered to scale.

Any suitable ferromagnetic materials may be used for magnetic layer 50 and magnetic underlayer 54. The materials for each layer may be the same or they may be different. The materials are preferably magnetically soft, with a preferred coercivity less than about 5 Oersted and more preferably less than about 1 Oersted. The chosen materials preferably have well defined magnetic anisotropy, meaning that they have a stable orientation of the easy axis of magnetization parallel to the ABS. In a preferred embodiment, magnetic layers 50 and 54 are made of CoFe, CoNiFe, FeCoN, CoNiFeN, FeAlN, FeTaN, FeN, NiFe (e.g. $Ni_{80}Fe_{20}$, $Ni_{45}Fe_{55}$, etc.), NiFeCr, NiFeN, CoZr, CoZrNb, FeAlSi, a permalloy, CoZrTa or another suitable material. Magnetic layers 50 and 54 can be of any suitable thickness for use in writer 36; they are preferably each between about 0.01 and about 1 micrometer thick, and more preferably between about 0.1 to about 0.5 micrometer thick.

Non-magnetic spacer 52 may be composed of any non-magnetic material which is mechanically and chemically compatible with the magnetic materials used for top magnetic layer 50 and magnetic underlayer 54. In an exemplary embodiment, non-magnetic spacer 52 between top magnetic layer 50 and magnetic underlayer 54 results in formation of an antiferromagnetic (AFM) exchange coupling between top magnetic layer 50 and magnetic underlayer 54. This coupling reinforces the anisotropy of top magnetic layer 50 and magnetic underlayer 54 oriented parallel to the ABS, resulting in a more stable main pole tip 45 due to a reduction in magnetic energy of the parallel state.

According to the RKKY (Ruderman-Kittel-Kasuya-Yosida) interaction, non-magnetic spacer 52 composed of some materials induces a periodic coupling between top magnetic layer 50 and magnetic underlayer 54. The coupling alternates characteristics between antiferromagnetic and ferromagnetic as a function of the thickness of non-magnetic spacer 52 and depends upon the crystallographic orientation of the material of non-magnetic spacer 52. Suitable non-magnetic materials for non-magnetic spacer 52 include, for example, copper, ruthenium, gold, tantalum, aluminum, rhodium, chromium, copper-silver alloys, nitride, carbide and various oxides, including aluminum oxide and silicon dioxide. Preferred non-magnetic materials are those which provide for antiferromagnetic exchange coupling between the adjacent magnetic layers, such as copper, ruthenium, gold, rhodium, chromium, and copper-silver alloys.

In a preferred embodiment, the thickness of non-magnetic spacer 52 is chosen to induce an antiferromagnetic coupling between top magnetic layer 50 and magnetic underlayer 54. If the thickness in the proximity corresponding to the first antiferromagnetic peak results in a non-magnetic spacer which is too thin to be practical, then the thickness of non-magnetic spacer 52 in the proximity corresponding to the next antiferromagnetic peak can be used, and so on. In one embodiment, Cu or Ru spacer 52 has a thickness of about 1 to about 200 Angstroms (Å), more preferably a thickness of about 3 to about 30 Å, and most preferably a thickness of about 6 to about 25 Å.

Any suitable material may be used for yoke 48, which is used in one embodiment to increase efficiency of writer 36, as well as enhance the anisotropy and structural and magnetic integrity of multilayer main pole tip 45. A length of main pole tip 45 is preferably about 0.02 to about 4.0 micrometers. Thus, yoke 48 is preferably recessed from the ABS by a distance of about 0.02 to about 4.0 micrometers so that yoke 48 does not contribute to an increased track width of main pole tip 45 at the ABS. A narrow track width of main pole tip 45 at the ABS allows for high track density recording and a narrow thickness of main pole tip 45 reduces skew-related side writing effects. In one embodiment, a length of yoke 48 is preferably about 8 to about 50 times the length of main pole tip 45.

In one embodiment, yoke 48 is made of a magnetic material such as CoNiFe, FeCoN, CoNiFeN, FeAlN, FeTaN, FeN, NiFe (e.g. $Ni_{80}Fe_{20}$, $Ni_{45}Fe_{55}$, etc.), NiFeCr, NiFeN, CoZr, CoZrNb, CoZrTa, FeAlSi, or other suitable materials. The chosen material preferably has well defined magnetic anisotropy, meaning that it has well defined easy and hard magnetic axes. The material is preferably magnetically soft, with a preferred coercivity less than about 5 Oersted and more preferably less than about 1 Oersted. Yoke 48 preferably has a relatively large magnetic permeability more than about 500, and more preferably more than about 1000.

In an exemplary embodiment, the portions of yoke 48 surrounding main pole tip 45 are shown as tapered wedges; however, they can also embody other configurations, such as graduated layers, for example. Additionally, while portions of yoke 48 are illustrated as being positioned above and below main pole tip 45, they can also be disposed on either side of main pole tip 45 in a case where yoke 48 is wider than main pole tip 45 in a lateral dimension.

Any suitable magnetic material may be used for back gap closure 42. In a preferred embodiment, back gap closure 42 is constructed of a soft magnetic material such as CoNiFe, NiFe, $Ni_{80}Fe_{20}$, $Ni_{45}Fe_{55}$, NiFeCr, CoZr, FeN, FeAlSi, or other suitable materials.

Figure 3:
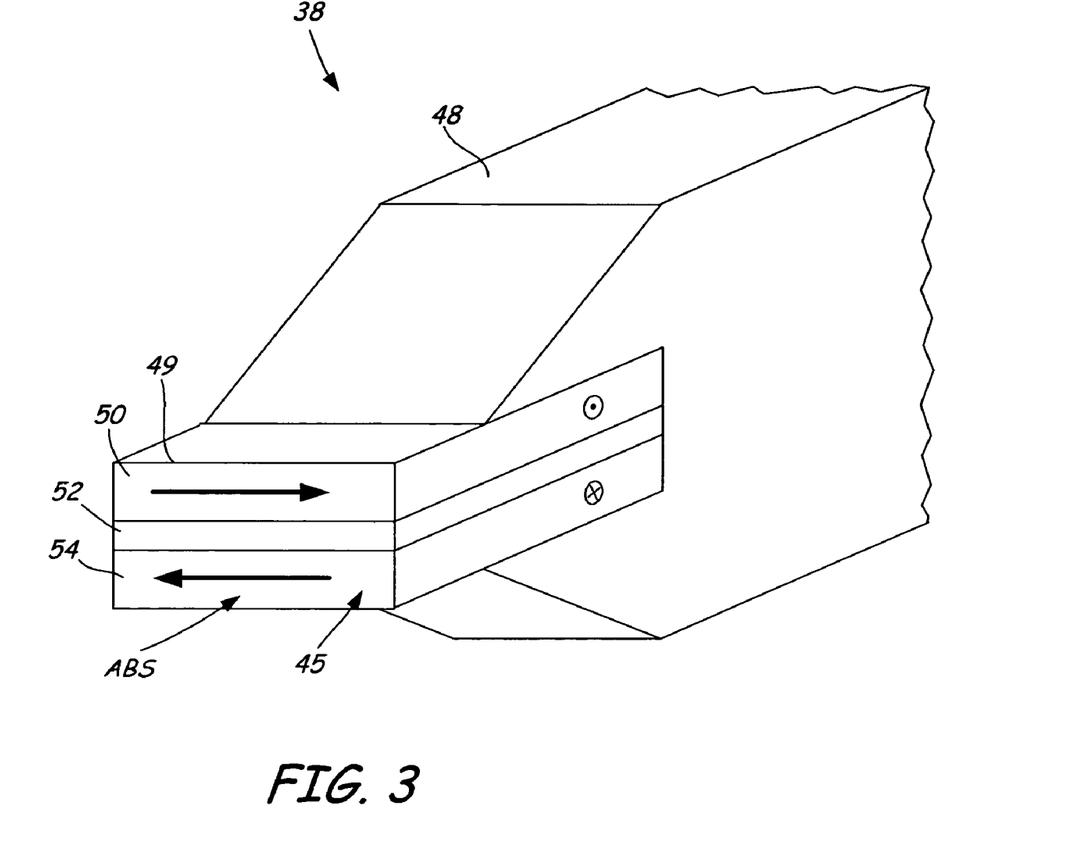
FIG. 3 is a perspective view of one embodiment of a main pole of the present invention.

FIG. 3 is a partial perspective view of an embodiment of a main pole of the present invention, viewed from a bottom of the pole tip. Main pole 38 includes main pole tip 45 partially embedded in yoke 48. Main pole tip 45 is preferably centered on yoke 48 to most efficiently conduct the flux flowing from yoke 48 and through pole tip 45. Main pole tip 45 of the present invention has first magnetic layer 50 with a first magnetic moment orientation and second magnetic layer 54 with a second magnetic moment orientation. While the terms "first" and "second" are used for discussion purposes, it is to be understood that the order of the layers may be reversed or otherwise altered. In an exemplary embodiment of main pole tip 45, the magnetic moment orientations or anisotropies of magnetic layers of 50 and 54 are fixed in a direction parallel to the bottom or external surface of the pole tip when the write current is off, thereby reducing unwanted erasure by reducing the remanent magnetization. This directional bias can be accomplished by means including but not limited to the choices of materials for the magnetic and non-magnetic layers, the thicknesses of the magnetic and non-magnetic layers, the application of stress or magnetostriction, the directional deposition of the materials of the magnetic and non-magnetic layers with low glancing angles, and the use of antiferromagnets or permanent magnets. By orienting the moments of magnetic layers 50 and 54 in a direction parallel to the ABS, for example, residual magnetization and the remanence charge left on the tip 45 of main pole 38 of perpendicular writer 36 are minimized when the writing current is off.

In one exemplary embodiment, the material of magnetic layer 50, which is proximate trailing edge 49, is made of a material with a higher saturation magnetic moment than the material of magnetic underlayer 54. Because the strength of the write field in the media is proportional to the magnetic moment of the main pole material, it is desirable to use a material with a high magnetic moment (or high flux density saturation) for construction of main pole tip 45 for ultra high track density recording. When the magnetic moment of the main pole material is increased, a track width and thickness of the main pole tip can be reduced for increasing the storage capacity of the disc drive while reducing skew-related effects. In an exemplary embodiment, magnetic layers 50 and 54 are antiferromagnetically exchanged coupled through nonmagnetic layer 52. The antiferromagnetic coupling of the high magnetic moment material of top magnetic layer 50 by lower magnetic moment material 54 leads to greater overall stability in main pole tip 45 while retaining the high writability and high data rate advantages of using the high magnetic moment material.

Figure 4:
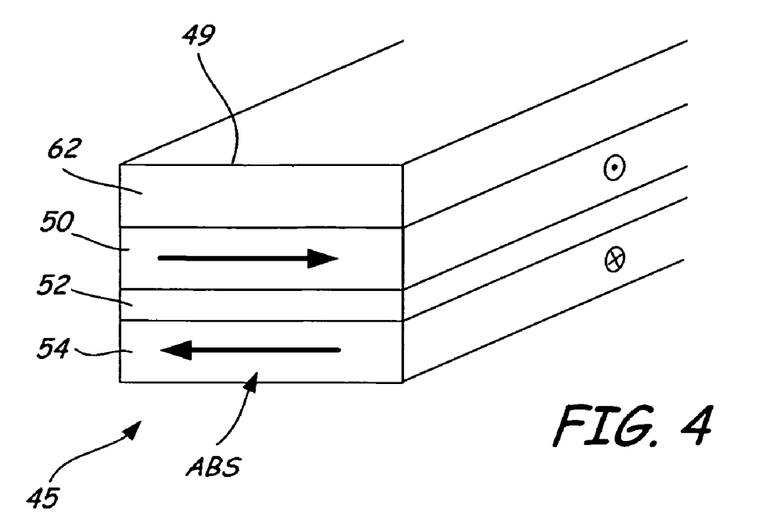
FIG. 4 is a partial perspective view of another embodiment of a main pole of the present invention.

FIG. 4 is a partial perspective view of another embodiment of a main pole tip of the present invention. In the illustrated embodiment of main pole tip 45 having trailing edge 49, anisotropy in magnetic layers 50 and 54 parallel to the plane of the ABS is induced by antiferromagnetic pinning layer or anisotropy inducing magnetic layer 62 contacting magnetic layer 50. Magnetic layer 62 induces the magnetic moment orientations of magnetic layers 50 and 54 into orientations substantially parallel to the ABS in the absence of a write current. Anisotropy inducing layer 62 is composed of an antiferromagnet or permanent magnet, for example. Examples of suitable antiferromagnets include Cr, NiO, MnO, IrMn, PtMn, NiMn, IrMnX, PtMnX, and NiMnX; where X represents a third element. Examples of suitable permanent magnets include Co; CoCr; CoPt; CoCrPt; $MFe_2O_4$, where M represents any one of several metallic elements; $Fe_3O_4$; $AB_{12}O_{19}$, where A is a divalent metal such as Ba, Sr, or Pb, and B is a trivalent metal such as Al, Ga, Cr or Fe; and $M_3Fe_5O_{12}$, where M is a rare earth ion such as Sm, Eu, Gd or Y.

Figure 5:
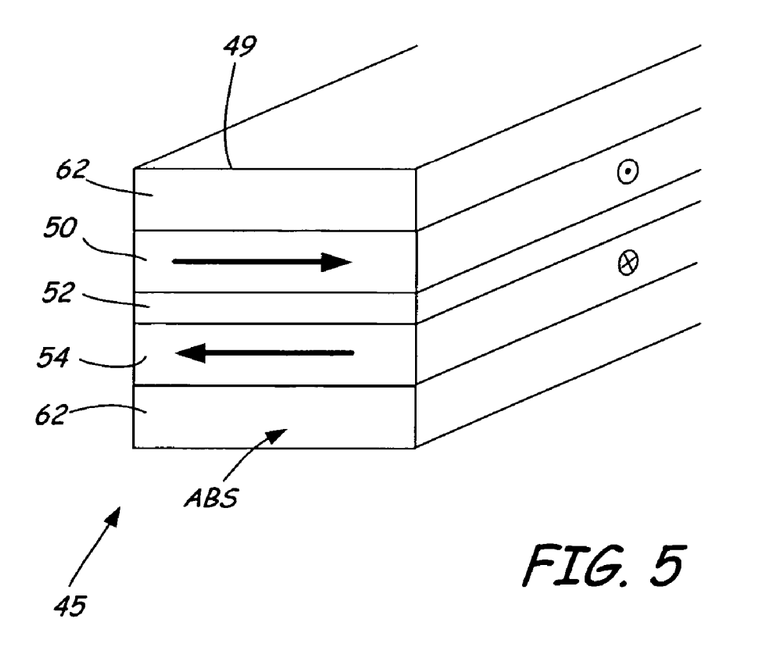
FIG. 5 is a partial perspective view of another embodiment of a main pole of the present invention.

FIG. 5 is a partial perspective view of another embodiment of a main pole tip of the present invention. In the illustrated embodiment of main pole tip 45, anisotropy inducing layers 62 are disposed adjacent to the magnetic layer 50 and magnetic layer 54. This configuration is useful where stronger pinning coupling is desirable to induce the orientations of the magnetic moments of magnetic layers 50 and 54 into directions parallel to the ABS.

Figure 6:
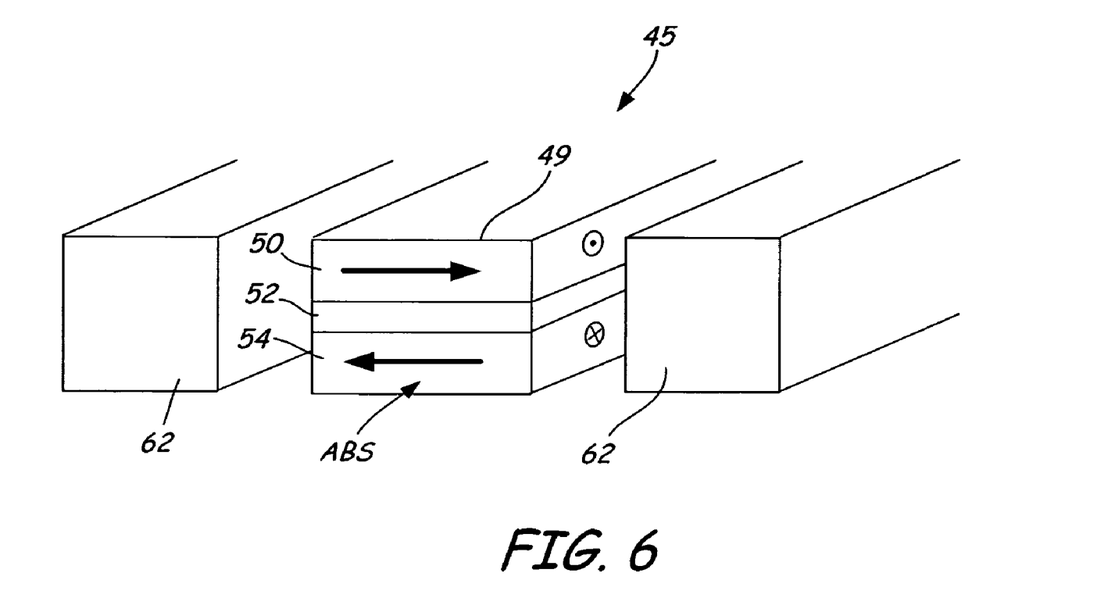
FIG. 6 is a partial perspective view of another embodiment of a main pole of the present invention.

FIG. 6 is a partial perspective view of another embodiment of a main pole tip of the present invention. In this embodiment, anisotropy inducing layers 62 are disposed on one or both sides of main pole 38, spaced apart from main pole tip 45, but in close proximity so that the magnetic fields of anisotropy inducing layers 62 act upon magnetic layers 50 and 54 in the absence of a write current. Those skilled in the art will appreciate that anisotropy inducing layers 62 could be disposed above or below main pole 38. In these embodiments, a distance between main pole tip 45 and each layer 62 is between about 10 nm and about 80 nm. These configurations are especially useful when it is desirable to keep the surface area of pole tip 45 as small as possible for increasing efficiency and reducing skew-related effects. In an exemplary embodiment, a cross sectional area of main pole tip 45 at the ABS is less than about 10,000 nm$^2$. The anisotropy inducing layers 62 switch the direction of the magnetic moments in main pole tip 45 into directions parallel to the ABS after the writing current is switched off, thereby decreasing or eliminating on-track erasure. In one embodiment, the longitudial biasing field provided by the biasing layers 62 is between about 5 Oe and about 2000 Oe, which is generally larger than the coercivity of the materials of writer 36 and generally smaller than the perpendicular field generated by coils 44, resulting in a decrease in on-track erasure while resulting in minimal interference with the recording process.

Figure 7:
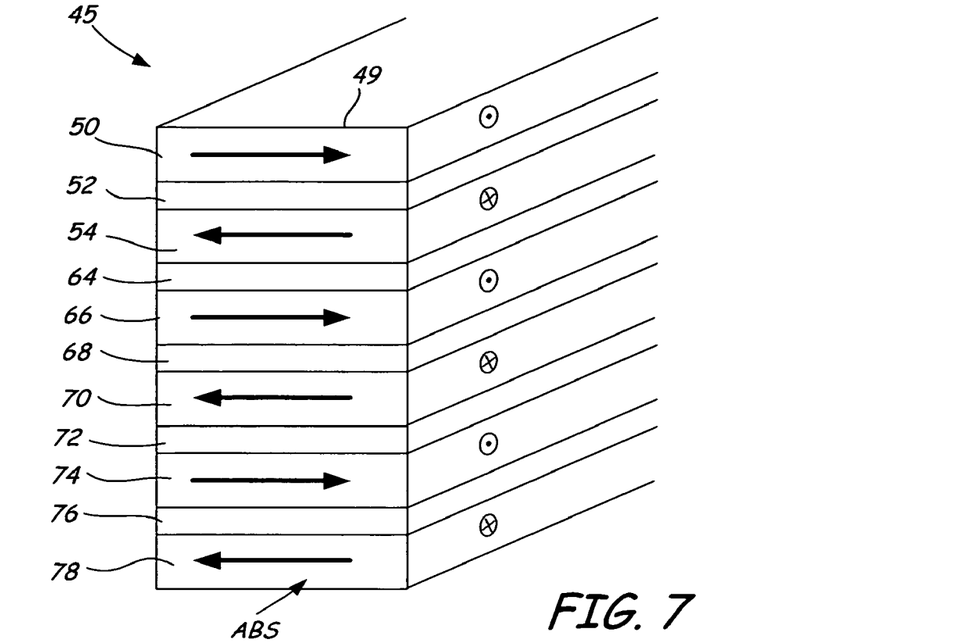
FIG. 7 is a partial perspective view of another embodiment of a main pole of the present invention.

FIG. 7 is a partial perspective view of another embodiment of a main pole tip of the present invention. Main pole tip 45 of FIG. 7 is similar to main pole tip 45 of FIG. 3, except that the embodiment illustrated in FIG. 7 includes additional magnetic layers 66, 70, 74 and 78 and additional non-magnetic layers 64, 68, 72 and 76. In the illustrated embodiment, each magnetic layer 50, 54, 66, 70, 74 and 78 is antiferromagnetically coupled to an adjacent magnetic layer so that the moments of adjacent layers align antiparallel to each other. In one exemplary embodiment, a magnetic moment gradient from trailing edge 49 is created by disposing magnetic layers of higher moment closer to trailing edge 49 and lower moment layers further away from trailing edge 49. While the multilayer structure of FIG. 7 leads to better performance uniformity than the structure of FIG. 3, due to the stronger overall levels of coupling between the magnetic layers 50, 54, 66, 70, 74 and 78, a large magnetic field is needed to saturate main pole 38 during the writing process.

In order to make it easier to saturate main pole 38, different materials can be chosen for non-magnetic layers 52, 64, 68, 72 and 76 to selectively determine the strength of coupling between the magnetic layers in one embodiment. For example, a conductive material such as a transition metal such as copper, ruthenium, gold, rhodium, or chromium, for example, can be used in non-magnetic layers 52, 68 and 76 to promote a relatively strong anti-parallel exchange coupling between magnetic layers 52 and 54, between magnetic layers 66 and 70, and between magnetic layers 74 and 78. Other non-magnetic materials, including transition metals of certain thicknesses, will cause only a weak antiferromagnetic exchange coupling between the two magnetic layers on either side of the non-magnetic layer. For example, an electrically insulating material such as tantalum, aluminum oxide, nitride, carbide, or silicon dioxide, for example, can be used for non-magnetic layers 64 and 72 to separate the sets of strongly coupled magnetic layers. In another example, Ru with a thickness of about 5 Å to about 10 Å is used in non-magnetic layers 52, 68 and 76 to promote a relatively strong anti-parallel exchange coupling between magnetic layers 52 and 54, between magnetic layers 66 and 70, and between magnetic layers 74 and 78. Ru with a thickness of about 12 Å to about 18 Å, which causes only a weak antiferromagnetic exchange coupling between the two magnetic layers on either side of the non-magnetic layer, is used in non-magnetic layers 64 and 72 to separate the sets of strongly coupled magnetic layers. With such configurations, each magnetic layer is antiferromagnetically coupled to an adjacent magnetic layer, but main pole 38 is easier to saturate during the writing process because the overall coupling strength of main pole tip 45 is decreased. This leads to higher writer efficiency while reducing on-track erasure.

Figure 8:
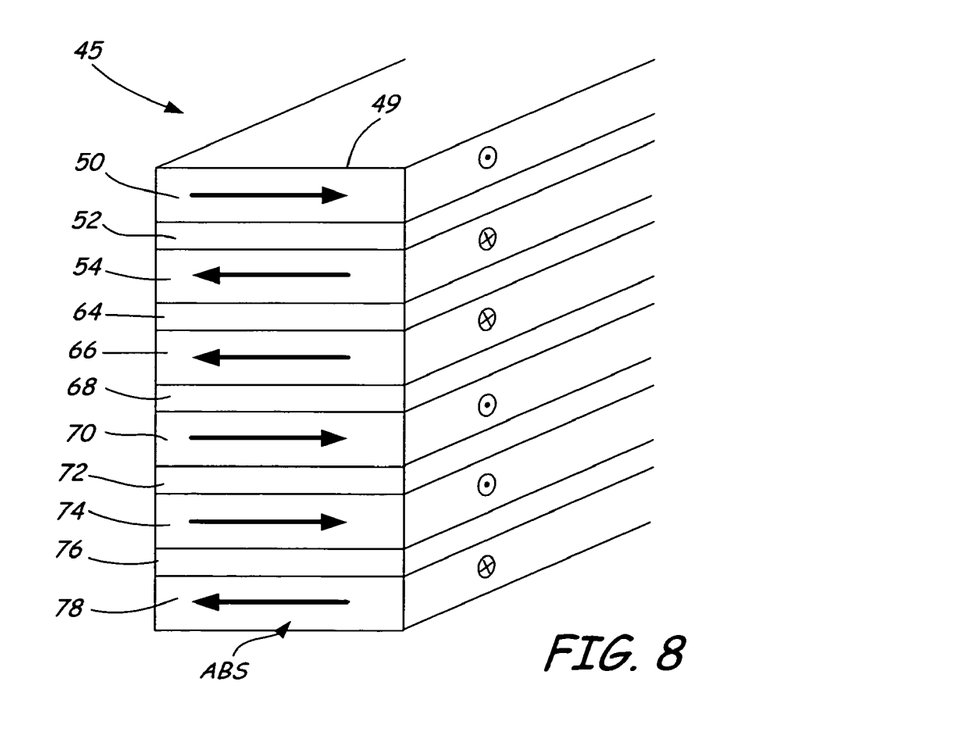
FIG. 8 is a partial perspective view of another embodiment of a main pole of the present invention.

FIG. 8 is a partial perspective view of yet another embodiment of a main pole tip of the present invention. Non-magnetic layer materials 64 and 72 couple but do not antiferromagnetically couple the magnetic layers on either side of the non-magnetic layers. Therefore, the moments of magnetic layers 54 and 66 point in the same direction, and the moment of magnetic layers 70 and 74 point in the same direction in the illustrated example. However, the magnetic layers are still arranged so that each pair of magnetic layers is antiferromagnetically coupled. For example, magnetic layers 50 and 54 are antiferromagnetically coupled by non-magnetic layer 52; magnetic layer 66 and 70 are antiferromagnetically coupled by non-magnetic layer 68; and magnetic layer 74 and 78 are antiferromagnetically coupled by non-magnetic layer 76. Since each magnetic layer has only one of its surfaces relatively strongly antiferromagnetically exchange coupled, the overall effective coupling strength of main pole tip 45 is reduced, making it easier to saturate main pole 38 during the writing process by requiring a smaller magnetic field, thereby leading to greater efficiency.

Figure 9:
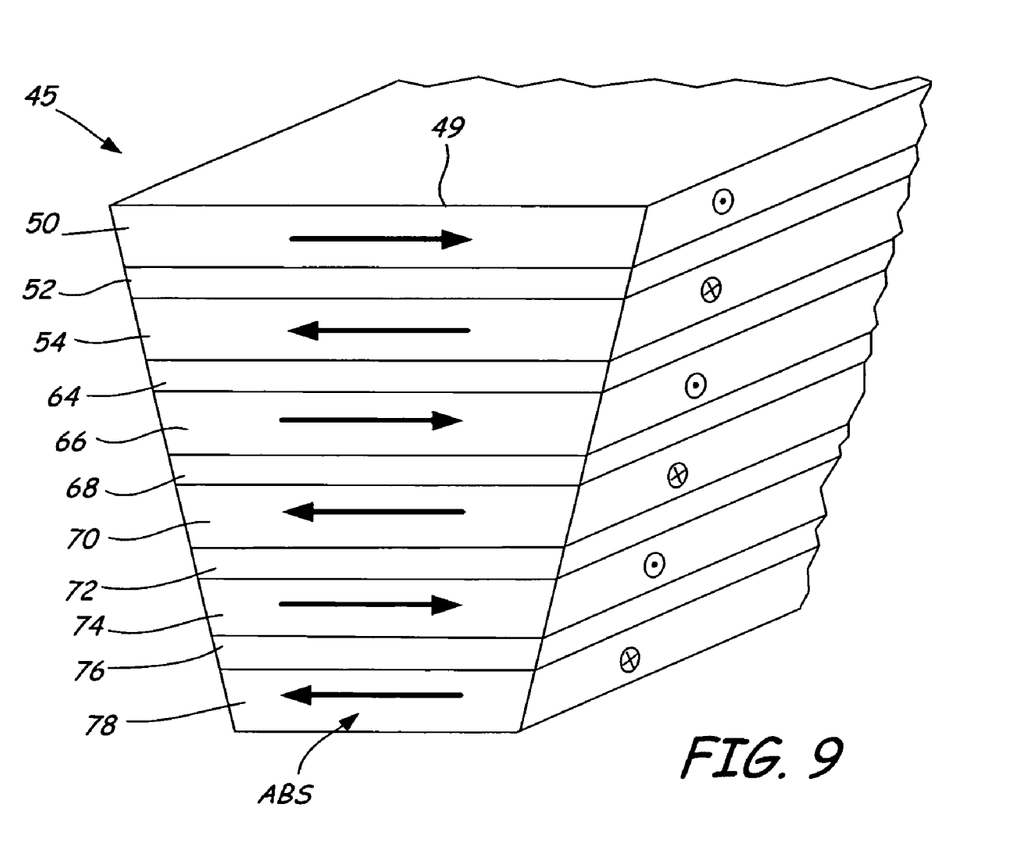
FIG. 9 is a partial perspective view of another embodiment of a main pole of the present invention.

FIG. 9 is a partial perspective view of another embodiment of a main pole tip of the present invention. Main pole tip 45 of FIG. 9 is similar to main pole tip 45 of FIG. 7 except that the embodiment of FIG. 9 includes a trapezoidal shape of main pole tip. In this embodiment a magnetic moment gradient from trailing edge 49 is created by disposing wider layers of magnetic materials closer to trailing edge 49 and narrower layers of magnetic materials further away from trailing edge 49. Thus, a gradient can be created even if each magnetic layer is made of materials with similar magnetic moment values.

Figure 10:
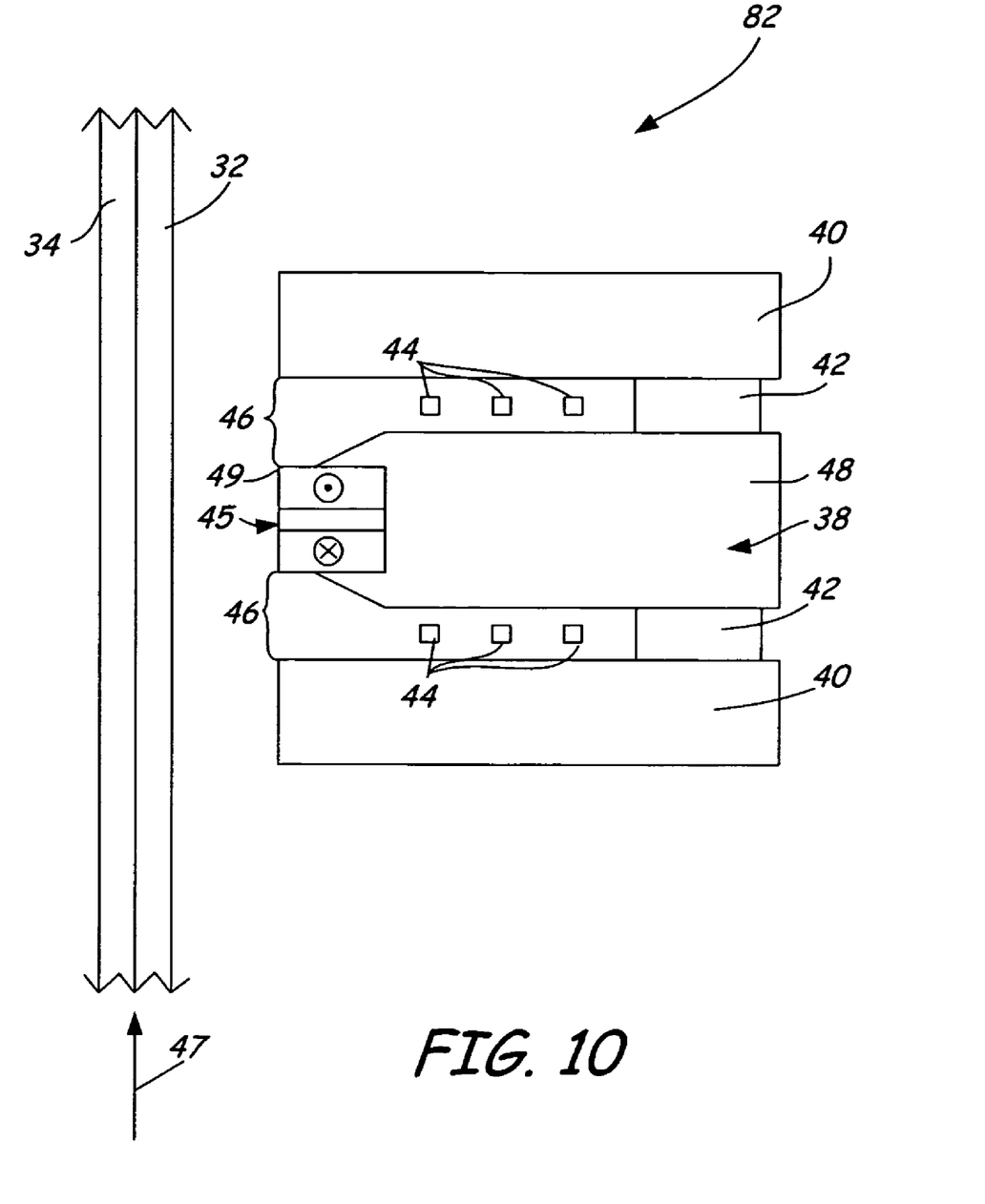
FIG. 10 is a partial cross-sectional view of another embodiment of the writer of the present invention.

FIG. 10 is a partial cross-sectional view of another embodiment of the writer of the present invention. Writer 82 of FIG. 10 is similar to writer 36 of FIG. 2, except that the embodiment illustrated in FIG. 10 includes an additional return pole 40 connected to main pole 38 by an additional back closure 42. This configuration reduces side erasure because the flux flowing through main pole 38 is directed to both return poles 40, effectively reducing the side flux effects by half. Writer 82 thereby increases writer efficiency while reducing both remanent erasure and side erasure effects.

Although the present invention has been described with reference to exemplary embodiments, workers skilled in the art will recognize that changes may be made in form and detail without departing from the spirit and scope of the invention.

The invention claimed is:

1. A device for emitting magnetic flux, the device comprising:
   a write coil; and
   a pole having a yoke formed of magnetic material and having a first end and a second end, and a pole tip for conducting magnetic flux to write data to a magnetic medium, the pole tip being partially embedded in the yoke and extending beyond the first end of the yoke, such that portions of the yoke surrounding the pole tip help direct the magnetic flux to the pole tip, the pole tip comprising a first end located outside the yoke, a second end located within the yoke and spaced from both the first end of the yoke and the second end of the yoke, and a plurality of magnetic layers magnetically coupled and biased so that their magnetic moment orientations are substantially parallel to an external surface when no write current is applied to the write coil.

2. The device of claim 1 further comprising:
   a plurality of nonmagnetic layers, each nonmagnetic layer disposed between a pair of magnetic layers;
   in which an intermediate magnetic layer is magnetically coupled with a magnetic layer on each side of the intermediate magnetic layer through the nonmagnetic layer therebetween.

3. The device of claim 2 in which the intermediate magnetic layer is antiferromagnetically coupled with a magnetic layer on one side of the intermediate magnetic layer.

4. The device of claim 2 in which the nonmagnetic layer on a first side of the intermediate magnetic layer is made of a different material than the nonmagnetic layer on a second side of the intermediate magnetic layer.

5. The device of claim 4 in which the nonmagnetic layer on the first side of the intermediate magnetic layer is chosen from the group consisting of copper, ruthenium, gold, rhodium and chromium.

6. The device of claim 5 in which the nonmagnetic layer on the second side of the intermediate magnetic layer is chosen from the group consisting of tantalum, nitride, carbide, aluminum oxide and silicon dioxide.

7. The device of claim 2, wherein one of the plurality of nonmagnetic layers is composed of a material selected from the group consisting of copper, ruthenium, gold, tantalum, aluminum, rhodium, chromium, copper-silver alloys, nitride, carbide, aluminum oxide and silicon dioxide.

8. The device of claim 2 in which a coupling strength between the intermediate magnetic layer and a magnetic layer on a first side of the intermediate magnetic layer is different than a coupling strength between the intermediate magnetic layer and a magnetic layer on a second side of the intermediate magnetic layer.

9. The device of claim 1 further comprising an anisotropy inducing magnetic layer.

10. The device of claim 9 in which the anisotropy inducing magnetic layer comprises an antiferromagnet.

11. The device of claim 9 in which the anisotropy inducing magnetic layer comprises a permanent magnet.

12. The device of claim 1 wherein the pole is a main pole, and further comprising:
    a first return pole; and
    a first back gap closure intermediate the main pole and the first return pole.

13. The device of claim 12 further comprising:
    a second return pole; and
    a second back gap closure intermediate the main pole and the second return pole.

14. The device of claim 1, wherein the one of the plurality of magnetic layers is composed of a material selected from the group consisting of CoFe, CoNiFe, FeCoN, CoNiFeN, FeAlN, FeTaN, FeN, NiFe, NiFeCr, NiFeN, CoZr, CoZrNb, FeAlSi, a permalloy, and CoZrTa.

15. The device of claim 1, in which the pole tip further comprises:
    a trailing edge;
    wherein a magnetic layer proximate the trailing edge has a higher magnetic moment value than a magnetic layer distant from the trailing edge.

16. The device of claim 1, in which the pole tip further comprises:
    a trailing edge;
    in which the pole tip has a trapezoidal cross section at the air bearing surface, and in which a magnetic layer proximate the trailing edge has a wider cross section than a magnetic layer distant from the trailing edge.

17. The device of claim 1, in which the plurality of magnetic layers include a first magnetic layer and a second magnetic layer, and in which a nonmagnetic layer separates the first and second magnetic layers.

18. The device of claim 17, in which the first and second magnetic layers are antiferromagnetically coupled.

19. A transducer comprising:
    a main pole tip for conducting magnetic flux to write data to a magnetic medium, the main pole tip having a nonmagnetic layer disposed between a pair of magnetic layers, a portion of the main pole tip having an external surface, wherein the pair of magnetic layers is magnetically coupled so that a magnetic moment orientation of each of the magnetic layers is substantially parallel to the external surface of the transducer in the absence of a write field; and
    a yoke having a first end and a second end, wherein the main pole tip is partially embedded in the yoke, such that portions of the yoke surrounding the main pole tip help direct the magnetic flux to the main pole tip, and wherein the main pole tip extends beyond the first end of the yoke, with a first end of the main pole tip located outside the yoke and a second end of the main pole tip located within the yoke, spaced from both the first end of the yoke and the second end of the yoke.

20. The transducer of claim 19, wherein the yoke further comprises a first side and a second side, further wherein a portion of the main pole tip is connected to either one of the first side and the second side of the yoke.

21. The transducer of claim 19, wherein each of the magnetic layers includes a first side and a second side, further wherein each magnetic layer is antiferromagnetically coupled on one of the first or second sides of the magnetic layer.

22. The transducer of claim 19, wherein the nonmagnetic layer is composed of a material selected from the group consisting of copper, ruthenium, gold, tantalum, aluminum, rhodium, chromium, copper-silver alloys, nitride, carbide, aluminum oxide and silicon dioxide.

23. The transducer of claim 19, wherein the nonmagnetic layer is a first nonmagnetic layer, the main pole tip further including a second nonmagnetic layer positioned between a second pair of magnetic layers, wherein the first nonmagnetic layer is composed of a nonmagnetic conductive material, and the second nonmagnetic layer is composed of a nonmagnetic insulating material.

24. A perpendicular writer comprising:
    a main pole comprising:
        a yoke having a first end and a second end;
        a main pole tip for conducting magnetic flux to write data to a magnetic medium, the main pole tip being partially embedded in the yoke and extending beyond the first end of the yoke so that portions of the yoke surrounding the main pole tip help direct the magnetic flux to the main pole tip, the main pole tip comprising:
- a first end located outside the yoke and a second end located within the yoke, spaced from both the first end of the yoke and the second end of the yoke, wherein a portion of the first end defines a plane; and
- at least one nonmagnetic layer positioned between at least two magnetic layers, wherein the at least two magnetic layers are coupled so that the magnetic moment orientation of each of the at least two magnetic layers is substantially parallel to the plane when no write current is applied to the main pole; and
- at least one coil positioned proximate the main pole.

25. The perpendicular writer of claim 24 in which the at least two magnetic layers are antiferromagnetically coupled.

26. The perpendicular writer of claim 24, wherein the at least one nonmagnetic layers is composed of a material selected from the group consisting of copper, ruthenium, gold, tantalum, aluminum, rhodium, chromium, copper-silver alloys, nitride, carbide, aluminum oxide and silicon dioxide.

27. The perpendicular writer of claim 24 further comprising:
- a first return pole; and
- a first back gap closure intermediate the main pole and the first return pole.

28. The perpendicular writer of claim 24, in which the main pole further comprises:
- a trailing edge;
- wherein a magnetic layer proximate the trailing edge has a higher magnetic moment value than a magnetic layer distant from the trailing edge.

* * * * *